US012420212B2

United States Patent

(12) United States Patent
Xie

(10) Patent No.: US 12,420,212 B2
(45) Date of Patent: Sep. 23, 2025

(54) PLANAR DISPENSER

(71) Applicant: Yichun Xie, Shantou (CN)

(72) Inventor: Yichun Xie, Shantou (CN)

( * ) Notice: Subject to any disclaimer, the term of this patent is extended or adjusted under 35 U.S.C. 154(b) by 242 days.

(21) Appl. No.: 18/324,965

(22) Filed: May 27, 2023

(65) Prior Publication Data

US 2024/0393078 A1 Nov. 28, 2024

(51) Int. Cl.

| | |
|---|---|
| ***G07D 11/00*** | (2019.01) |
| ***A63H 33/00*** | (2006.01) |
| ***F41B 4/00*** | (2006.01) |
| ***G07D 11/16*** | (2019.01) |

(52) U.S. Cl.

CPC ............... *A63H 33/00* (2013.01); *F41B 4/00* (2013.01); *G07D 11/16* (2019.01); *B65H 2402/41* (2013.01)

(58) Field of Classification Search

CPC ........... A63H 29/20; A63H 33/00; F41B 4/00; G07D 11/16; B65H 2402/41

USPC ............ 124/1, 31, 52, 78, 82; 221/232, 258, 221/277; 446/473

See application file for complete search history.

(56) References Cited

U.S. PATENT DOCUMENTS

| | | | | | |
|---|---|---|---|---|---|
| 2,766,989 | A * | 10/1956 | Sivertson | A63F 1/14 | 124/1 |
| 3,191,588 | A * | 6/1965 | Thew | F41B 7/006 | 124/31 |
| 4,884,992 | A * | 12/1989 | Grimes | G07F 1/02 | 221/24 |
| 4,890,404 | A * | 1/1990 | Ferri | F41C 3/12 | 124/2 |
| 4,910,646 | A * | 3/1990 | Kim | G07D 1/08 | 362/112 |
| 5,718,427 | A * | 2/1998 | Cranford | A63F 1/12 | 273/149 R |
| 5,782,228 | A * | 7/1998 | Wu | F41B 4/00 | 124/6 |
| 6,116,229 | A * | 9/2000 | Wu | F41B 4/00 | 124/6 |
| 8,955,503 | B2 * | 2/2015 | Corsiglia | A63B 69/406 | 124/78 |
| 9,189,908 | B2 * | 11/2015 | Sampson | B65H 3/56 | |
| 9,207,035 | B2 * | 12/2015 | Schexnayder | F41B 4/00 | |
| 9,427,120 | B1 * | 8/2016 | Valentine | B65H 5/002 | |

(Continued)

FOREIGN PATENT DOCUMENTS

| | | |
|---|---|---|
| CN | 20658742 U | 10/2017 |
| CN | 206587421 U * | 10/2017 |
| CN | 206683481 U * | 11/2017 |

*Primary Examiner* — Alexander R Niconovich

(57) ABSTRACT

A planar ejector is disclosed, including an ejecting mechanism and a motor mounted on a side of an interior of the ejecting mechanism. A top of the ejector is provided with a compress mechanism, and a side of a bottom of the compress mechanism is provided with a support plate. The ejecting mechanism includes a first shell, a side of the first shell is clamping connected to a second shell, the first shell and the side of the first shell are opened with an ejecting slot, and the first shell and a side of a bottom of the first shell are fixedly mounted with a first handle. By setting the motor and increasing the utilization efficiency of the motor, the force area is also shared with the two eject gears, allowing the motor's power to be fully utilized and thus increasing the permissible capacity of the ejector.

6 Claims, 6 Drawing Sheets

(56) References Cited

U.S. PATENT DOCUMENTS

| | | | | |
|---|---|---|---|---|
| 10,109,136 | B2 * | 10/2018 | McGowan | F21L 4/00 |
| 11,198,072 | B2 * | 12/2021 | Waxkirsh | A63F 1/14 |
| 2013/0312722 | A1 * | 11/2013 | Price | F41B 15/00<br>124/1 |
| 2014/0165985 | A1 * | 6/2014 | Bryngelson | A63H 37/00<br>124/82 |

* cited by examiner

PLANAR DISPENSER

TECHNICAL FIELD

This application relates to the technical field of eject devices, specifically to a planar ejector.

BACKGROUND

With development and progress of society, a variety of toy guns appear in the market, into millions of families, appear in children's games, to win the majority of children's love. Even in the adult games, the toy guns are often used. However with the rapid development of the economy and fast-paced life, people have more ways of entertainment and also more entertainment needs, for example, in a cheerful atmosphere people sprinkle cards to create a lively scene.

CN206587421U discloses a banknote gun, including a power unit and a gun shell. The gun shell is composed of a lower shell, an upper shell, an upper cover and a battery cover plate. The upper cover, by pins, is connected with an upper end of a side plate of the upper shell and an upper end of a side plate of the lower shell, a cavity between the upper cover and the upper and lower shells is a storage box, and banknotes are placed in the storage box. At the front of the storage box is provided with a bar slot as an outlet for the banknotes, the lower and upper shells are provided with axle holes corresponding to the pins. The pins pass through the aperture at the end of the upper cover and inserted into the axle holes, a left spring is nested on a junction between the pins and the aperture of lower shell, a right spring is nested on a junction between the pins and the aperture of the upper shell. In this way, the storage box is easy to open for storing banknotes or papers. Trough use of an impeller and an electric switch, which may realize the banknotes or papers one by one being ejected out, the papers being dispersed, thereby creates a kind of effect of the rain of banknotes. The operation is simple and amount of ejecting is easy to control. The banknote gun has a small size and easy to carry around, but this patent has following problems in actual use process.

The banknote gun drives the rotation of the impeller through the micro motor so as to realize the ejection of banknotes. However, the friction between the banknotes and the impeller bracket is effective, and when part of the banknotes are ejected, the friction between the banknotes and the impeller decreases due to a reduced weight of the banknotes, so that the banknotes cannot be ejected from the storage box smoothly, and meanwhile, because only one set of impeller is provided, resulting in a limited force area between the banknotes and the impeller, thus not being able to provide sufficient power for the banknotes to be ejected.

The present disclosure provides a planar ejector to facilitate overcome the problems discussed above.

SUMMARY

An objective of the present disclosure is to provide a planar ejector to solve problems that discussed in the background, that is, the friction between the banknotes and the impeller bracket is effective, and when part of the banknotes are ejected, the friction between the banknotes and the impeller decreases due to a reduced weight of the banknotes, so that the banknotes cannot be ejected from the storage box smoothly, and meanwhile, because only one set of impeller is provided, resulting in a limited force area between the banknotes and the impeller, thus not being able to provide sufficient power for the banknotes to be ejected.

In order to achieve above objective, the present disclosure provides a planar ejector, including an ejecting mechanism and a motor mounted on a side of an interior of the ejecting mechanism.

A top of the ejector is provided with a compress mechanism, and a side of a bottom of the compress mechanism is provided with a support plate.

The ejecting mechanism includes a first shell, a side of the first shell is clamping connected to a second shell, the first shell and the side of the first shell are opened with an ejecting slot, and the first shell and a side of a bottom of the first shell are fixedly mounted with a first handle.

Herein the first shell and a side of the bottom of the first shell near the first handle is fixedly mounted with a second handle.

Herein a side of a top of the first handle is rotatably connected with a rotating plate, and a bottom of the rotating plate is fixedly connected with a switch.

Preferably, a side of the rotating plate is clamping connected to a limit block, a side of the bottom of the rotating plate is rotatably connected with a connecting stopper, one end of the connecting stopper is clamping connected to a limit plate, a limit hole is opened in a middle of the limit plate, and an ejecting base plate is fixedly mounted on the first shell and an interior of the first shell.

Preferably, one end of the ejecting base plate is fixedly mounted with a battery jar, a top of the battery jar is clamping connected with a battery protection cover, one end of the ejecting base plate away from the battery jar is fixedly mounted with a motor bracket, the motor bracket is provided with a motor mounting groove inside, the motor is fixedly mounted inside the motor mounting groove, rotation rod limit slots are symmetrically opened on one side of the motor bracket.

Preferably, an output end of the motor is fixedly connected to a power worm, one end of the power worm is rotatably connected to a worm rotation shaft, a top of the power worm is engaged to a power turbine, the power turbine is fixedly connected to a turbine rotation rod inside, two ends of the turbine rotation rod are symmetrically mounted with eject gears, the first shell and a middle of the first shell are provided with a pressure plate sliding slot.

Preferably, the compress mechanism includes a mounting roof, a side of a top of the mounting roof is fixedly mounted with a sighting device, the support plate is fixedly mounted on a side of a bottom of the mounting roof, the bottom of the mounting roof is symmetrically mounted with spring pads, bottoms of the spring pads are fixedly connected to pressure springs, and the pressure springs inside are slidingly attached to spring telescopic rods.

Preferably, bottoms of the spring telescopic rods are fixedly connected to a compress base plate, the compress base plate in both sides of middle is symmetrically provided with toggle blocks, the toggle blocks are slidingly connected to the first shell through a pressure plate sliding slot, and the pressure springs are fixedly connected to the compress base plate.

Preferably, the mounting roof is clamping connected to the first shell, the spring telescopic rods are fixedly connected to the spring pads, and the support plate is clamping connected to the first shell.

Compared with the existing technologies, the advantages of the present disclosure are as follows. The planar ejector, by setting the motor to drive the power worm rotation, the turbine rotation rod and the eject gears are driven to rotate by the engagement between the power worm and the power turbine, which can improve the utilization efficiency of the motor and meanwhile can distribute the force area to the two eject gears, and the compress mechanism is set to realize the pressing of small bills, papers, coupons and other lightweight articles. The details are described below.

1. By setting the motor to drive the power worm rotation, the turbine rotation rod and the eject gears are driven to rotate by the engagement between the power worm and the power turbine, which can increase the utilization efficiency of the motor and meanwhile can distribute the force area to the two eject gears, so that the power of the motor is fully exerted, thus increasing the permissible capacity of the ejector. The eject gears are controlled by the motor to achieve a balance of forces and to reduce the direct force area of the motor so that the motor can rotate more smoothly.

The compress mechanism can be set to compress small bills, papers, coupons, cards, and other lightweight articles to facilitate rolling out of the articles such as small bills, papers, coupons, cards, and other lightweight articles on the eject base plate. The toggle block can drive the compress base plate to compress the pressure springs and the spring telescopic rods, thus facilitating the placement of the articles on top of the eject base plate and ejecting of the articles.

Figure 1:
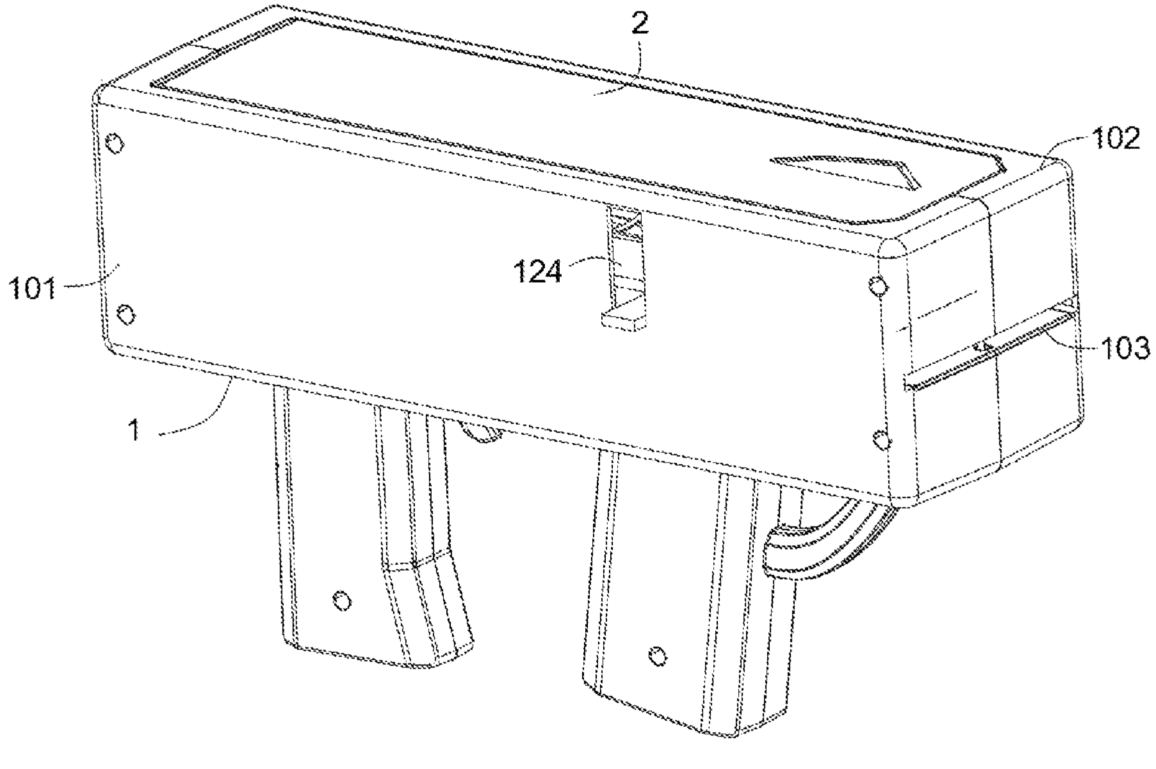
FIG. 1 is a schematic diagram of an overall three-dimensional structure of the planar ejector in accordance with the present disclosure.

In the drawings, the reference signs are as follows. 1. ejecting mechanism, 101. first shell, 102. second shell, 103. ejecting slot, 104. first handle, 106. rotating plate, 107. switch, 108. limit block, 109. connecting stopper, 110. limit plate, 111. limit hole, 112. eject base plate, 113. battery jar, 114. battery protection cover, 115. motor bracket, 116. motor mounting groove, 117. motor, 118. power worm, 119. worm rotating shaft, 120. power turbine, 121. turbine rotation rod, 122. eject gears, 123. rotation rod limit slots, 124. pressure plate sliding sot, 2. compress mechanism, 201. mounting roof, 202. sighting devide, 203. support plate, 204. spring pads, 205. pressure springs, 206. spring telescopic rods, 207. compress base plate, 208. toggle block.

DETAILED DESCRIPTION OF THE EMBODIMENTS

The following will be a clear and complete description of the technical solutions in the embodiments of the present disclosure in conjunction with the accompanying drawings in the embodiments of the present disclosure. Obviously, the described embodiments are only a part of the embodiments of the present disclosure, and not all of them. Based on the embodiments in the present disclosure, all other embodiments obtained by a person of ordinary skill in the art without making creative labor shall fall within the scope of protection of the present disclosure.

Figure 2:
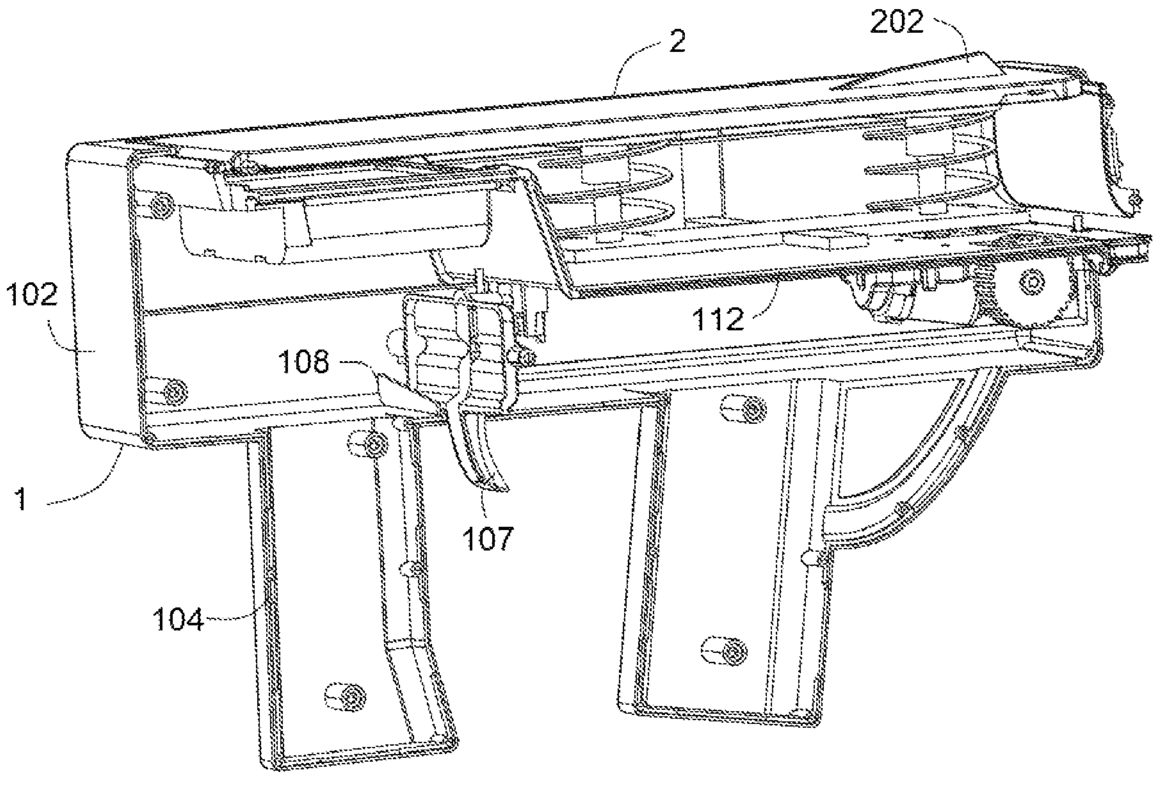
FIG. 2 is a schematic diagram of an overall section three-dimensional structure of the planar ejector in accordance with the present disclosure.
Figure 3:
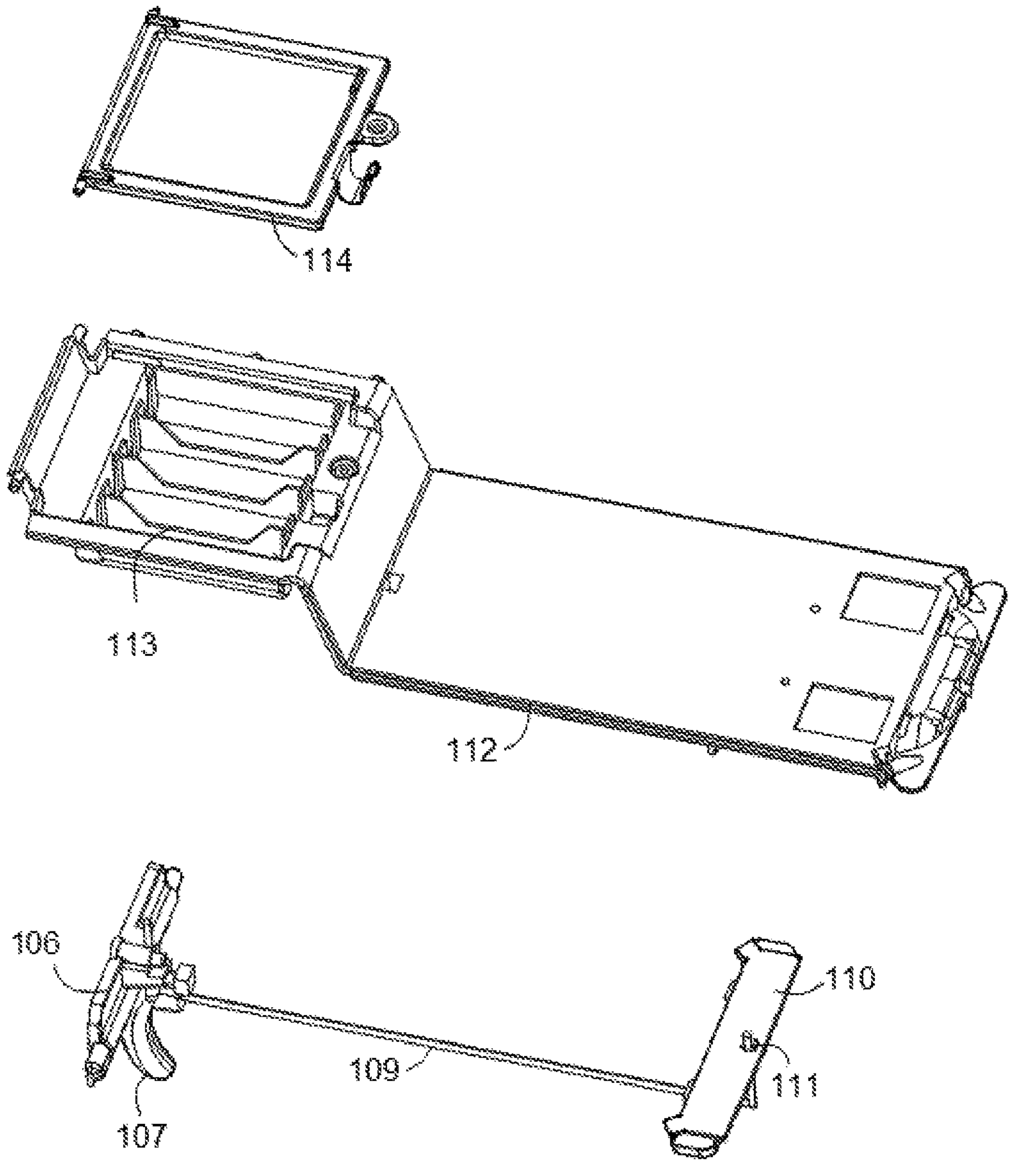
FIG. 3 is a schematic diagram of a three-dimensional structure of the eject base plate in accordance with the present disclosure.
Figure 4:
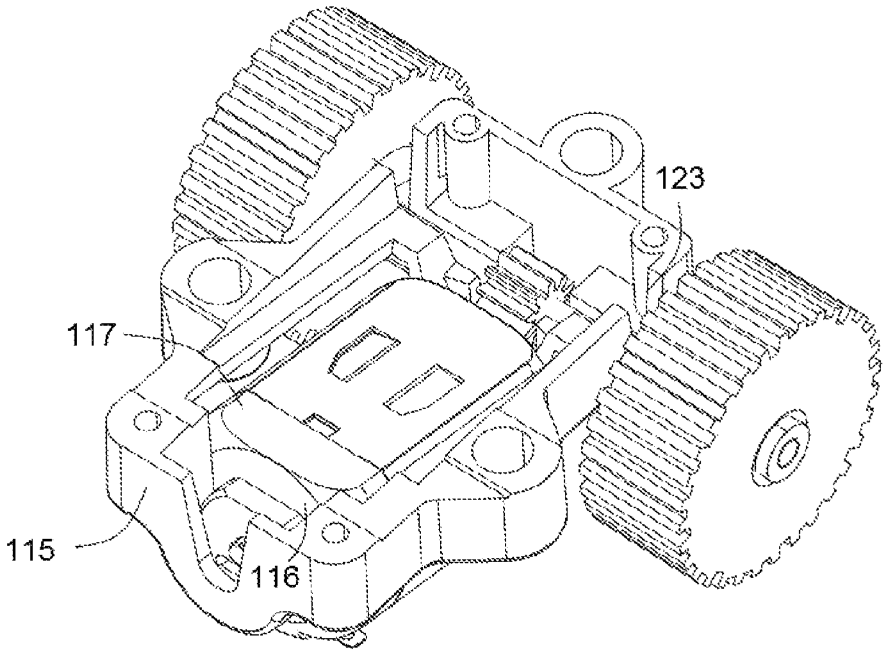
FIG. 4 is a schematic diagram of a three-dimensional structure of the motor bracket in accordance with the present disclosure.
Figure 5:
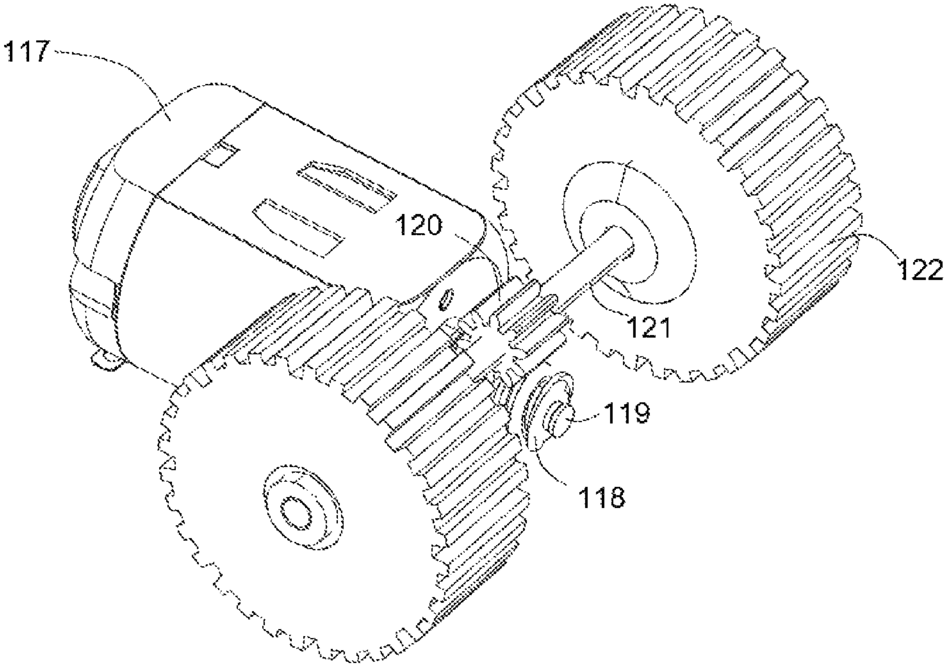
FIG. 5 is a schematic diagram of a three-dimensional structure of the eject gearing in accordance with the present disclosure.
Figure 6:
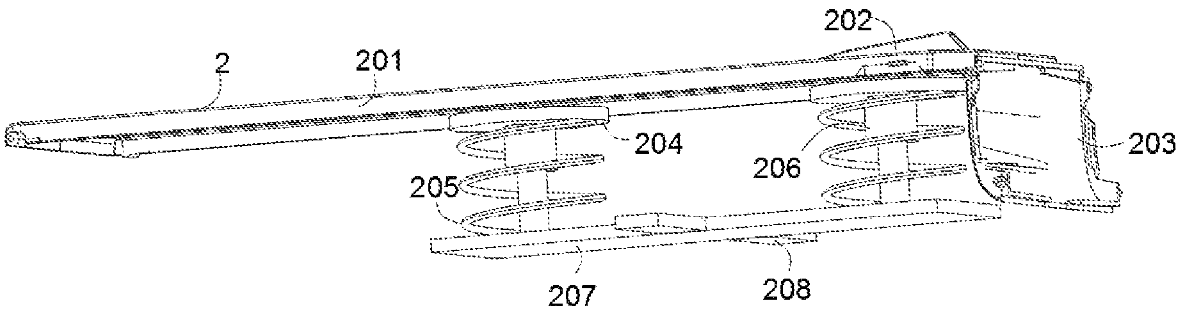
FIG. 6 a schematic diagram of a three-dimensional structure of the compress mechanism in accordance with the present disclosure.

Referring to FIG. 1 to FIG. 6, the present disclosure provides a planar ejector, including an ejecting mechanism 1 and a motor 117 mounted on a side of an interior of the ejecting mechanism 1. A top of the ejector 1 is provided with a compress mechanism 2, and a side of a bottom of the compress mechanism 2 is provided with a support plate 203. The ejecting mechanism 1 includes a first shell 101, a side of the first shell 101 is clamping connected to a second shell 102, the first shell 101 and the side of the first shell 101 are opened with an ejecting slot 103, and the first shell 101 and a side of a bottom of the first shell 101 are fixedly mounted with a first handle 104. Herein the first shell 101 and a side of the bottom of the first shell 101 near the first handle 104 is fixedly mounted with a second handle. Herein a side of a top of the first handle 104 is rotatably connected with a rotating plate 106, and a bottom of the rotating plate 106 is fixedly connected with a switch 107. A side of the rotating plate 106 is clamping connected to a limit block 108, a side of the bottom of the rotating plate 106 is rotatably connected with a connecting stopper 109, one end of the connecting stopper 109 is clamping connected to a limit plate 110, a limit hole 111 is opened in a middle of the limit plate 110, and an ejecting base plate 112 is fixedly mounted on the first shell 101 and an interior of the first shell 101. One end of the ejecting base plate 112 is fixedly mounted with a battery jar 113, a top of the battery jar 113 is clamping connected with a battery protection cover 114, one end of the ejecting base plate 112 away from the battery jar 113 is fixedly mounted with a motor bracket 115, the motor bracket 115 is provided with a motor mounting groove 116 inside, the motor 117 is fixedly mounted inside the motor mounting groove 116, rotation rod limit slots 123 are symmetrically opened on one side of the motor bracket 115. An output end of the motor 117 is fixedly connected to a power worm 118, one end of the power worm 118 is rotatably connected to a worm rotation shaft 119, a top of the power worm 118 is engaged to a power turbine 120, the power turbine 120 is fixedly connected to a turbine rotation rod 121 inside, two ends of the turbine rotation rod 121 are symmetrically mounted with eject gears 122, the first shell 101 and a middle of the first shell 101 are provided with a pressure plate sliding slot 124. By setting the motor 117 to drive the power worm 118 to rotate, the turbine rotation rod 121 and the eject gears 122 are driven to rotate by the engagement of the turbine worm between the power worm 118 and the power turbine 120, thus increasing the utilization efficiency of the motor 117 and meanwhile dispersing the force area to two eject gears 122, allowing the full power of the motor 117 to be exerted, thereby increasing the allowable capacity of the ejector.

The compress mechanism 2 includes a mounting roof 201, a side of a top of the mounting roof 201 is fixedly mounted with a sighting device 202, the support plate 203 is fixedly mounted on a side of a bottom of the mounting roof 201, the bottom of the mounting roof 201 is symmetrically mounted with spring pads 204, bottoms of the spring pads 204 are fixedly connected to pressure springs 205, and the pressure springs 205 inside are slidingly attached to spring telescopic rods 206. Bottoms of the spring telescopic rods 206 are fixedly connected to a compress base plate 207, the compress base plate 207 in both sides of middle is symmetrically provided with toggle blocks 208, the toggle blocks 208 are slidingly connected to the first shell 101 through a pressure plate sliding slot 124, and the pressure springs 205 are fixedly connected to the compress base plate 207. The mounting roof 201 is clamping connected to the first shell 101, the spring telescopic rods 206 are fixedly connected to the spring pads 204, and the support plate 203 is clamping connected to the first shell 101. By setting the compress mechanism 2, it is possible to achieve compression of other lightweight articles such as small bills, papers, coupons, etc., thereby facilitating rolling out of the articles such as small bills, papers, coupons, etc. on the eject base plate 112.

Operating principle: before using the planar ejector, it is necessary to check the overall condition of this device to make sure that it can carry out normal work. According to FIG. 1 to FIG. 6, firstly, open the mounting roof 201, place the cards to be ejected on the top of the eject base plate 112, and meanwhile slide the toggle block 208 to drive the compress base plate 207 to compress the pressure springs 205 and the spring telescopic rods 206, to provide sufficient space for articles to be placed, while install the battery into battery jar 113 and close the mounting roof 201. Secondly, open the switch 107 to drive rotating plate 106 for rotating, so that the rotating plate 106 is connected to power and drives the motor 117 and the power worm 118 to rotate, using the turbine worn engagement action between the power worn 118 and the power turbine 120, which drives the turbine rotation rod 121 and the eject gears 122 to rotate, articles on the top of the eject gears 122 is ejected from the ejecting slot 103, using the elasticity between the pressure springs 205 and the spring telescopic rods 206, the articles are always able to fit the top of the eject gears 122, thus enabling an uninterrupted ejecting of the cards.

Despite the detailed description of the present disclosure with reference to the preceding embodiments, it is still possible for the person of ordinary skill in the art to modify the technical solutions recorded in the preceding embodiments or to make equivalent substitutions for some of the technical features therein, and any modifications, equivalent substitutions, improvements, etc. made within the spirit and principles of the present disclosure shall be included in the protection scope of the present disclosure.

I claim:

1. A planar ejector, comprising an ejecting mechanism and a motor mounted on a side of an interior of the ejecting mechanism;

a top of the ejecting mechanism is provided with a compress mechanism, and a side of a bottom of the compress mechanism is provided with a support plate;

wherein the ejecting mechanism comprises a first shell, a side of the first shell is clamping connected to a second shell, the first shell and the side of the first shell are provided with an ejecting slot, the first shell and a side of a bottom of the first shell are fixedly mounted with a first handle;

wherein the first shell and a side of the bottom of the first shell near the first handle is fixedly mounted with a second handle;

wherein a side of a top of the first handle is rotatably connected with a rotating plate, and a bottom of the rotating plate is fixedly connected with a switch;

wherein a side of the rotating plate is clamping connected to a limit block, a side of the bottom of the rotating plate is rotatably connected with a connecting stopper, one end of the connecting stopper is clamping connected to a limit plate, a limit hole is provided in a middle of the limit plate, and an ejecting base plate is fixedly mounted on the first shell and an interior of the first shell.

2. The planar ejector according to claim 1, wherein one end of the ejecting base plate is fixedly mounted with a battery jar, a top of the battery jar is clamping connected with a battery protection cover, one end of the ejecting base plate away from the battery jar is fixedly mounted with a motor bracket, the motor bracket is provided with a motor mounting groove inside, the motor is fixedly mounted inside the motor mounting groove, rotation rod limit slots are symmetrically provided on one side of the motor bracket.

3. The planar ejector according to claim 2, wherein an output end of the motor is fixedly connected to a power worm, one end of the power worm is rotatably connected to a worm rotation shaft, a top of the power worm is engaged to a power turbine, the power turbine is fixedly connected to a turbine rotation rod inside, two ends of the turbine rotation rod are symmetrically mounted with eject gears, the first shell and a middle of the first shell are provided with a pressure plate sliding slot.

4. The planar ejector according to claim 1, wherein the compress mechanism comprises a mounting roof, a side of a top of the mounting roof is fixedly mounted with a sighting device, the support plate is fixedly mounted on a side of a bottom of the mounting roof, the bottom of the mounting roof is symmetrically mounted with spring pads, bottoms of the spring pads are fixedly connected to pressure springs, and the pressure springs inside are slidingly attached to spring telescopic rods.

5. The planar ejector according to claim 4, wherein bottoms of the spring telescopic rods are fixedly connected to a compress base plate, the compress base plate in both sides of middle is symmetrically provided with toggle blocks, the toggle blocks are slidingly connected to the first shell through a pressure plate sliding slot, and the pressure springs are fixedly connected to the compress base plate.

6. The planar ejector according to claim 5, wherein the mounting roof is clamping connected to the first shell, the spring telescopic rods are fixedly connected to the spring pads, and the support plate is clamping connected to the first shell.

* * * * *